United States Patent [19]
Von Stoutenborough et al.

[11] Patent Number: 4,984,473
[45] Date of Patent: Jan. 15, 1991

[54] TORQUE MONITOR

[75] Inventors: Eric Von Stoutenborough; David J. Lang, both of Rockford, Ill.

[73] Assignee: Sundstrand Corporation, Rockford, Ill.

[21] Appl. No.: 386,260

[22] Filed: Jul. 28, 1989

[51] Int. Cl.⁵ .............................................. G01L 3/14
[52] U.S. Cl. ................................ 73/862.19; 73/862.31
[58] Field of Search ............ 73/862.19, 862.49, 862.31, 73/178 R; 340/945, 671; 244/75 R, 213

[56] References Cited

U.S. PATENT DOCUMENTS

| | | | |
|---|---|---|---|
| 3,209,090 | 9/1965 | Fry | 200/47 |
| 3,221,118 | 11/1965 | Hoover | 200/47 |
| 3,504,555 | 4/1970 | Fry | 74/89.15 |
| 3,682,283 | 8/1972 | Sato | 316/68 |
| 3,935,754 | 2/1976 | Comollo | 75/665 F |
| 4,435,988 | 3/1984 | Corry et al. | 73/862.19 |
| 4,765,191 | 8/1988 | Kume | 73/862.19 |

Primary Examiner—Donald O. Woodiel
Attorney, Agent, or Firm—Wood, Phillips, Mason, Recktenwald & VanSanten

[57] ABSTRACT

Reliability problems in a torque monitor are reduced in a simplified construction including a housing (30) journalling first and second coaxial shafts (34), (42). The second shaft (42) is mounted for axial movement within the housing (30), and a sleeve (58) has a threaded connection (56), (60) to the second shaft (42), and a spline connection (36), (62) to the first shaft (34). A switch (82), (84), is mounted in the housing (30) and a switch actuator (80) is mounted for movement towards and away from the switch (82), (84) to change the condition of the same. A shoulder (68) on the second shaft (42) may engage and drive the switch actuator (80) upon axial movement of the second shaft (42) in one direction, while a shoulder (96), (102) on the sleeve (58) may engage and drive the switch actuator (80) upon axial movement of the sleeve (58) in the one direction and relative to the other shaft (34) to provide an indication of relative movement between the shafts (34) and (42).

12 Claims, 3 Drawing Sheets

TORQUE MONITOR

FIELD OF THE INVENTION

This invention relates to apparatus for monitoring for failure in a primary drive system and for providing an indication of failure when failure occurs, as well as activating a secondary power path.

BACKGROUND OF THE INVENTION

Many mechanical power transmission devices are employed in environments where failure would be so critical, that redundant drive paths, that is, primary and secondary drive paths, are provided. A common example is in systems employed for changing the configuration of airfoils in aircraft such as flaps. Since proper control of an aircraft depends upon the ability to properly control the various airfoils that may be changed to change the aircraft configuration, it is absolutely necessary that control over the airfoils be maintained at all times. Conventionally, a primary load path is utilized to interconnect an actuator or drive for the airfoil with the airfoil itself. Additionally, a secondary path of power transmission to the airfoil from the drive is also provided. In the usual case, only the primary path is loaded during operation. Should it fail, then the loading is placed on the secondary path which allows control of the flaps until there is an opportunity to have the primary load path repaired.

Conventionally too, an indication of failure of the primary load path is provided upon the occurrence of such failure so as to alert appropriate personnel to the need for repair.

In airborne environments, it is, of course, highly desirable to minimize weight and volume of components, as well as to provide highly reliable systems.

The present invention is directed to accomplishing those goals.

SUMMARY OF THE INVENTION

It is the principal object of the invention to provide a new and improved torque monitor. More particularly, it is an object of the invention to provide such a torque monitor that is highly reliable and is made up of a minimum number of components.

An exemplary embodiment of the invention achieves the foregoing object in a torque monitor including a housing with first and second coaxial shafts journalled for rotation within the housing. The second shaft is further mounted for axial movement within the housing. A sleeve is threaded on one of the shafts and is splined to the other of the shafts. The monitor includes a switch and a switch actuator is disposed within the housing and mounted for movement toward and away from the switch to change the condition of the same. First means are provided on the second shaft for engaging and driving the switch actuator upon axial movement of the second shaft in one direction, and second means are disposed on the sleeve for engaging and driving the switch actuator upon axial movement of the sleeve in the one direction and relative to the other shaft.

In a highly preferred embodiment, the first shaft is hollow and the second shaft is located within the first shaft. The sleeve is interposed between the two shafts.

Preferably, the sleeve is splined to the first shaft and threaded to the second shaft.

The invention also contemplates the provision of first lock-up means on the sleeve and on the second shaft for locking the same against relative rotation after predetermined relative rotation in one direction, and second lock-up means on the sleeve and on the second shaft for locking the same against relative rotation after predetermined relative rotation in the other direction.

In an exemplary embodiment of the invention, the lock-up means comprise interengagable, axially facing sets of teeth or stop jaws.

A highly preferred embodiment of the invention further includes anti back-off means for preventing release of either of the lock-up means once either has locked the sleeve and the second shaft against relative movement. In a highly preferred embodiment, such anti back-off means comprise a spring loaded plunger in the second shaft and spaced slots in the sleeve for receiving the plunger.

Other objects and advantages will become apparent from the following specification taken in connection with the accompanying drawings.

DESCRIPTION OF THE PREFERRED EMBODIMENT

Figure 1:
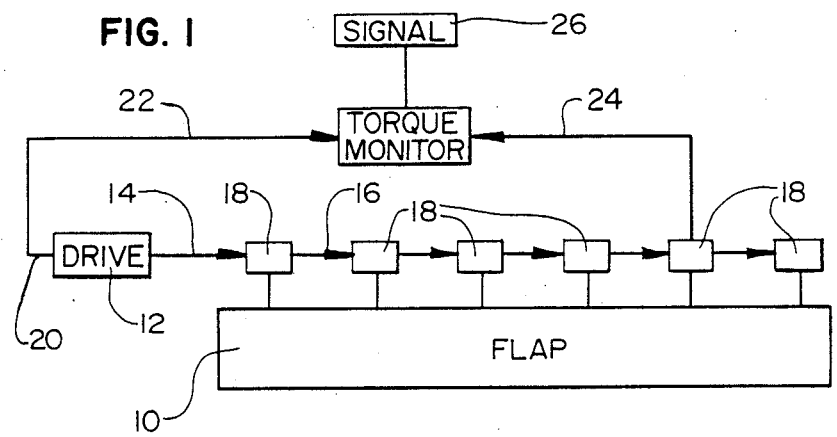
FIG. 1 is a schematic view of a system in which a torque monitor made according to the invention may be utilized.

An exemplary embodiment of the invention is intended to be used in a system, for example, for controlling the disposition of the leading edge flap 10 on one wing of an aircraft. The system will typically include a bidirectional drive unit 12 having a main output shaft 14 extending to a torque tube that extends between a plurality of flap actuators 18. The arrangement is such that when the drive unit 12 is activated, rotary power is conveyed via the torque tube 16 to the actuators 18 which then move the flap 10 to change its disposition as commanded.

Power for a secondary load path is taken off the back side of the drive unit 12 at the location shown at 20 and conveyed via a solid shaft 22 to a torque monitor made according to the invention. The torque monitor in turn is connected via a flexible shaft 24 to one of the end most actuators 18.

In the normal case, when the torque tube 16 is driving the actuators 18, the rotative force applied to the torque tube 16 by the drive 12 is also applied to the torque monitor via the shaft 22. The rotative force felt near the end of the power train is also applied to the torque monitor via the connection of the flexible shaft 24 thereto However, rotative force will not be transmitted through the shafts 22 and 24 at this time.

It is the function of the torque monitor to determine whether any relative rotation exists since such would indicate failure within the primary load path. When such occurs, a signal is generated on a signalling device or indicator 26. In addition, power from the drive 12 is then applied via the flexible shaft 24.

Figure 2:
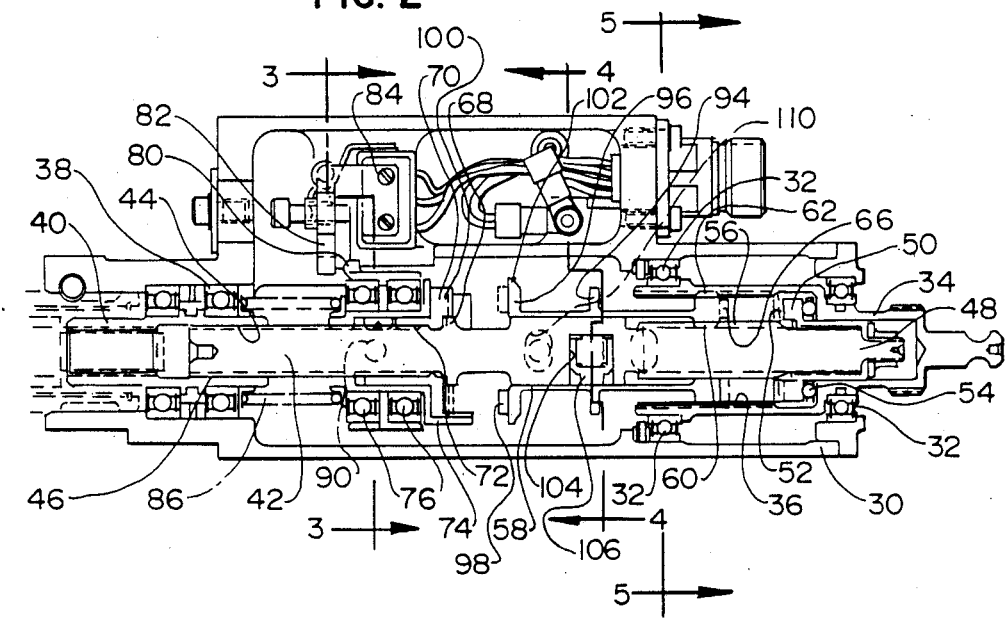
FIG. 2 is a sectional view of an exemplary embodiment of the torque monitor.

Turning now to FIG. 2, the make-up of the torque monitor will be described in greater detail. Included is a housing 30 with bearings 32 therein journalling a hollow shaft 34 for rotation within the housing 30. The hollow shaft 34 is typically adapted to be connected to the shaft 22 (FIG. 1). The hollow shaft has interior axial splines 36.

Additional bearings 38 within the housing 30 journal a sleeve 40 which may be splined to the flexible shaft 24. The sleeve 40 serves as a means of support for a shaft 42 within the housing which is coaxial with the shaft 34. The sleeve 40 includes internal splines 44 at one end which are engaged with external splines 46 on the shaft 42 so that the latter may move axially within the housing 30 as well as rotate therein.

The end 48 of the shaft opposite the splines 46 mounts a collar 50 which includes teeth 52 that face axially and to the left as viewed in FIG. 2. A thrust bearing 54 is disposed between the collar 50 and an internal step on the shaft 34.

The shaft 42, adjacent the teeth 52, includes an external threaded section 56. A sleeve 58 having an internal thread or nut 60 is located on the shaft 42 with the threads 56 and 60 engaged. The sleeve 58 also includes an external spline 62 which is engaged with the internal spline 36 on the shaft 34. Thus, the sleeve 58 is fixed against rotation relative to the shaft 34, but may rotate on the shaft 42. However, because the connection is one of a thread, relative rotation between the sleeve 58 and the shaft 42 will result in the sleeve 58 advancing toward one end or the other of the shaft 42, depending upon the direction of relative rotation.

Adjacent the thread 60 and spline 62, the sleeve 58 includes axially directed teeth 66 which extend to the right as viewed in FIG. 2. The teeth 66 may engage the teeth 52 upon sufficient rightward movement of the sleeve 58 as viewed in FIG. 2 and when such occurs, the sleeve 58 becomes locked to the shaft 42 and further relative rotation between the two will not occur in that direction.

Intermediate the ends of the shaft 42, the same includes a radially outwardly directed shoulder 68. The shoulder 68 abuts a collar 70 which is splined to the shaft 42 by interengaging splines 72. The collar 70 also mounts an actuating finger assembly 74 which in turn mounts bearings 76. The outer races of the bearings 76 in turn mount a switch actuator 78 having a nose 80 that may be brought into abutment with the operators 82 of a pair of microswitches 84 mounted within the housing. When the operators 82 are moved, the condition of the switches 84 will be changed and this may be utilized to activate the signalling device 26 (FIG. 1). That is to say, the condition of the switches 84 is changed when a failure in the primary load path is determined as when relative motion occurs between the shaft 34 and the sleeve 40.

A compression coil spring 86 biases the finger assembly 74, the collar 70 and the switch actuator 80 to the right, as viewed in FIG. 2.

Figure 3:
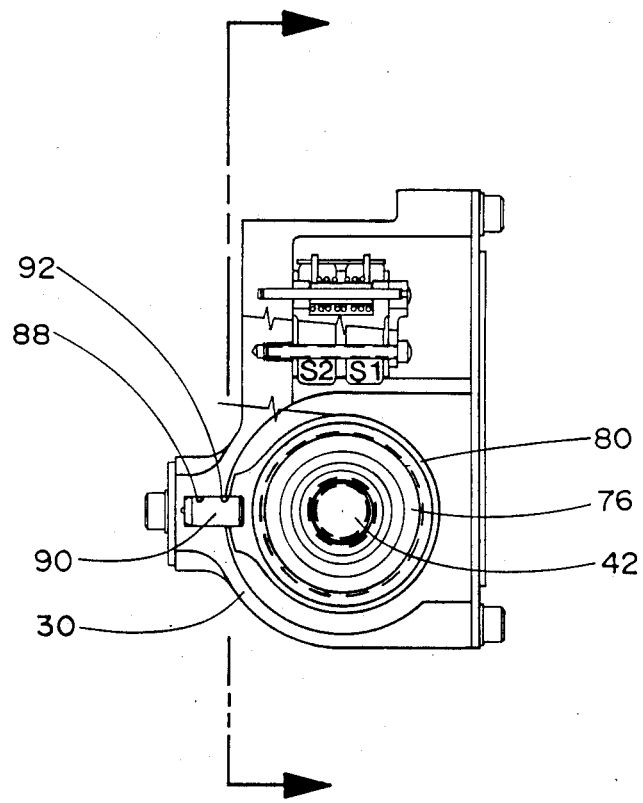
FIG. 3 is a sectional view taken approximately along the line 3—3 in FIG. 2.

It will be appreciated that relative motion between the switch actuator 80 and the operator 82 is not to be desired, which is the reason for interposing the bearings 76 between the rotary components including the shaft 42 and the switch actuator 80. To assure that the same does not rotate, the housing 30 includes a bore 88 (FIG. 3) in which an anti-rotation pin 90 is disposed. The pin 90 extends radially inwardly toward the shaft 42 into an axially elongated groove 92 in the side of the switch actuator 80 thereby preventing the latter from rotating relative to the housing 30.

Returning to FIG. 2, the sleeve 58 includes a radial shoulder 94 intermediate its ends and, at the end opposite the thread 60 and spline 62, includes a radially outwardly directed shoulder 96 which is located radially outward of the shoulder 68 on the shaft 42. The shoulder 96 mounts axially directed teeth 98 which face to the left as viewed in FIG. 2.

The right-hand side of the collar 70 likewise mounts axially directed teeth 100 which extend to the right as viewed in FIG. 2, and which may be engaged by the teeth 98 on the sleeve 58 if the latter moves sufficiently to the left as viewed in FIG. 2. When that occurs, the sleeve 58 is locked against further relative rotation with respect to the shaft 42 by reason of the collar 70 being splined to the shaft 42.

Before that happens, however, a radially outer part 102 of the shoulder 96 may engage the finger assembly 74 which will ultimately drive the switch actuator 80 to the left, as viewed in FIG. 2, against the operators 82 for the switches 84 and change the condition of the latter.

Figure 4:
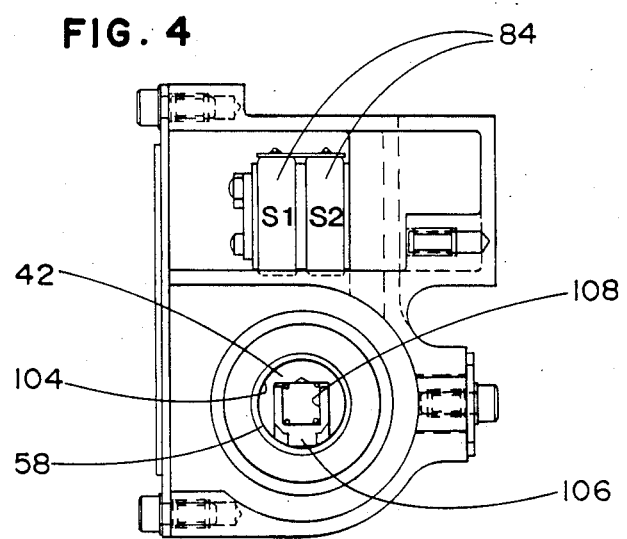
FIG. 4 is a sectional view taken approximately along the line 4—4 in FIG. 2.

As seen in FIGS. 2 and 4, the shaft 42, just to the left of the thread 56, includes an internal radial bore 104. A plunger 106 is located in the bore 104 and is backed by a compression coil spring 108 which urges the plunger 106 radially outward.

As can be appreciated from the showings in FIGS. 2 and 4, normally, the plunger 58 will be restrained against such outward movement by engagement with the interior wall of the sleeve 58.

Figure 5:
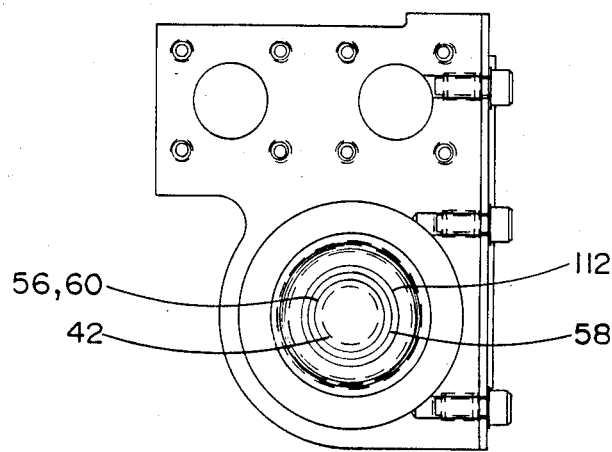
FIG. 5 is a sectional view taken approximately along the line 5—5 in FIG. 2.

Referring to FIGS. 2 and 5, at axially spaced locations, the sleeve 58 includes first and second slots 110 and 112. It will thus be appreciated that should the plunger 106 be aligned with one or the other of the slots 110 or 112, the spring 108 will bias the plunger 106 into such slot. Except to the extent that there is play between the plunger 106 and the slots 110 or 112, this will result in a locking of the sleeve 58 to the shaft 42. The construction just described acts as an anti back-out means, in that the plunger 106 will drop into the slot 112 when the teeth 98 and 100 are engaged and prevent the same from being disengaged until the plunger is physically removed from the slot 112. Similarly, the slot 110 is set to receive the plunger 106 when the teeth 52 and 66 are engaged, and to prevent the sleeve 58 from being backed away from the teeth 52.

In operation, when there is no failure, both the shaft 34 and the sleeve 40, and thus the shaft 42 will be rotating at the same speed and in the same direction. As a consequence, the sleeve 58 will simply be carried along idly and power will not be actually transmitted at this time. Should, however, there be a failure in the primary power path, the shaft 34 will continue to rotate at the normal speed, while the rotation of the sleeve 40, and thus the shaft 42 will be retarded or halt entirely. As a consequence, relative rotation between the shaft 34 and the shaft 42 will occur. Since the sleeve 58 is splined to the shaft 34, it will continue to rotate at the same speed; but since the shaft 42 is no longer rotating at that particular speed and the sleeve 58 is threaded to the shaft 42, the sleeve 58 will begin to move axially on the shaft 42 in one direction or the other depending upon the direction of rotation of the shaft 34. For one direction of rotation, the sleeve 58 will move to the right as viewed in FIG. 2. Once the shoulder 94 has contacted the left end of the shaft 34, a leftward force will be placed on the shaft 42 and will cause the shoulder 68 to ultimately drive the switch actuators 80 against the switches operator 82 to change the condition of the switches 84 and provide an indication of primary power path failure. Continued operation will bring the teeth 66 into engagement with the teeth 52 halting further relative rotation between the sleeve 58 and the shaft 42, so that power may now be transmitted from the shaft 34 to the shaft 42, and ultimately to the sleeve 40, and then to the drive system via the flexible shaft 24 (FIG. 1). At this time, the plunger 106 will have dropped into the slot 110 so that if the direction of rotation of the shaft 34 is reversed as a result of reversal of the drive unit 12, the threaded connection provided by the threads 56 and 60 cannot operate to allow the sleeve 58 to back away from the teeth 52. Thus, the system will transmit in either direction without lost motion.

Again assuming normal operation, but the opposite direction of rotation of the shaft 34, when failure occurs, the sleeve 58 will advance axially on the shaft 42, this time in the leftward direction. After a short distance is travelled, the outer extremity 102 of the shoulder 96 will engage the finger assembly 74 and ultimately drive the switch actuator 80 against the switch operators 82 to trip the switches 84 and provide an indication of power path failure. Shortly thereafter, continued relative rotation will cause the sleeve 58 to move sufficiently to the left, such that the teeth 98 will engage the teeth 100 thereby locking the sleeve 58 to the shaft 42 against further relative rotation. At this time, the plunger 106 will have dropped into the slot 112, so that if the direction of relative rotation is reversed, the sleeve 58 cannot back away from the teeth 74 to provide bidirectional drive force through the secondary load path without lost motion. At the same time, the secondary load path is transmitting power via the teeth 98 and 100.

From the foregoing, it will be appreciated that a torque monitor made according to the invention is simple in terms of minimizing the number of components and thus has high reliability.

What is claimed is:

1. A torque monitor comprising:
   a housing;
   first and second coaxial shafts journalled for rotation within said housing, said second shaft further being mounted for axial movement within said housing;
   a sleeve threaded on one of said shafts and splined to the other of said shafts;
   a switch;
   a switch actuator within said housing and mounted for movement toward and away from said switch to change the condition of the same;
   first means on said second shaft for engaging and driving said switch actuator upon axial movement of said sleeve in said one direction and relative to said other shaft; and
   second means on said sleeve for engaging and driving said switch actuator upon axial movement of said sleeve in said one direction and relative to said other shaft.

2. The torque monitor of claim 1 wherein said first shaft is hollow and said second shaft is located within said first shaft and said sleeve is interposed between said shafts.

3. The torque monitor of claim 2 wherein said sleeve is splined to said first shaft and threaded to said second shaft.

4. The torque monitor of claim 3 further including first lock-up means on said sleeve and said second shaft for locking the same against relative rotation after predetermined relative rotation in the other direction and second lock-up means on said sleeve and said second shaft for locking the same against relative rotation after predetermined relative rotation in the other direction.

5. The torque monitor of claim 4 wherein said lock-up means comprise interengagable, axially facing teeth.

6. The torque monitor of claim 4 further including anti back-off means for preventing release of either said lock-up means once either has locked the sleeve and the second shaft against relative movement.

7. The torque monitor of claim 6 wherein said anti back-off means comprise a spring loaded plunger in said second shaft and spaced slots in said sleeve for receiving the plunger.

8. A torque monitor comprising:
   a housing;
   first and second coaxial shafts journalled for rotation within said housing, said second shaft further being mounted for axial movement within said housing;
   a sleeve threaded on one of said shafts and splined to the other of said shafts;
   first lock-up means on said sleeve and said one shaft for locking said sleeve and said one shaft against relative rotation after predetermined relative rotation in one direction has occurred; and
   second lock-up means on said sleeve and said one shaft for locking said sleeve and said one shaft against relative rotation after predetermined relative rotation in the other direction has occurred.

9. The torque monitor of claim 8 wherein said one shaft is said second shaft and said other shaft is said first shaft.

10. The torque monitor of claim 8 wherein one of said sleeve and said one shaft mounts a plunger biased in the radial direction and the other of said sleeve and said one shaft includes axially spaced, plunger receiving slots.

11. The torque monitor of claim 8 wherein said first shaft is hollow and said second shaft is located within said first shaft and said sleeve is interposed between said shafts.

12. A torque monitor comprising:
   a housing;
   a hollow shaft journalled for rotation in said housing and having an internal, axial spline;
   a sleeve having an external spline disposed within said hollow shaft for axial movement relative thereto with said splines engaged to prevent relative rotation, said sleeve having an internal thread;
   an additional shaft having an external thread disposed within and threaded to said sleeve and being journalled for rotation within said housing;
   an actuator mounted on said additional shaft for axial movement thereon;
   a shoulder on said additional shaft for driving said actuator axially in one direction upon axial movement of said additional shaft in said one direction and engagement of said shoulder with said actuator;
   a switch mounted in the path of movement of said actuator so as to be trippable thereby;
   a shoulder on said sleeve radially outward of said shoulder on said additional shaft for driving said actuator axially upon axial movement of said sleeve in said one direction and engagement of said sleeve shoulder with said actuator;
   a first set of teeth on said sleeve shoulder and said actuator and engagable to prevent relative rotation between said sleeve and said additional shaft upon predetermined movement of said sleeve in said one direction;

a second set of teeth on said sleeve and said additional shaft and engagable to prevent relative rotation between said sleeve and said additional shaft upon predetermined movement of said additional shaft in said one direction;

a plunger carried by said additional shaft;

a spring biasing said plunger in the radial direction; and first and second axially spaced slots in said sleeve and respectively located to receive said plunger upon engagement of the teeth of said first and second sets.

* * * * *